US012784007B2

(12) United States Patent
Davis

(10) Patent No.: US 12,784,007 B2
(45) Date of Patent: Nov. 3, 2026

(54) SYSTEMS AND METHODS FOR ORDERING A REPLACEMENT COMPONENT OR REPAIR SERVICE

(71) Applicant: STATE FARM MUTUAL AUTOMOBILE INSURANCE COMPANY, Bloomington, IL (US)

(72) Inventor: Timothy Joel Davis, Warrenville, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 141 days.

(21) Appl. No.: 18/756,647

(22) Filed: Jun. 27, 2024

(65) Prior Publication Data

US 2024/0346462 A1 Oct. 17, 2024

Related U.S. Application Data

(60) Continuation of application No. 18/143,163, filed on May 4, 2023, now Pat. No. 12,045,783, which is a (Continued)

(51) Int. Cl.

*G06Q 30/00* (2023.01)
*G06Q 10/20* (2023.01)
*G06Q 30/0601* (2023.01)

(52) U.S. Cl.

CPC ......... *G06Q 10/20* (2013.01); *G06Q 30/0613* (2013.01); *G06Q 30/0631* (2013.01); *G06Q 30/0633* (2013.01)

(58) Field of Classification Search

CPC . G06Q 10/20; G06Q 30/0613; G06Q 30/0633
See application file for complete search history.

(56) References Cited

U.S. PATENT DOCUMENTS 8,490,006 B1 7/2013 Reeser et al.
8,527,306 B1 9/2013 Reeser et al.
(Continued)

FOREIGN PATENT DOCUMENTS

EP 3239686 A1 11/2017
EP 3578433 B1 8/2020
(Continued)

OTHER PUBLICATIONS

T. Keskin and D. Kennedy, "Strategies in Smart Service Systems Enabled Multi-sided Markets: Business Models for the Internet of Things," 2015 48th Hawaii International Conference on System Sciences, 2015, pp. 1443-1452. http://ieeexplore.ieee.org/starnp/starnp.jsp?tp=&arnurnber=7069984&isnurnber=7069647.

*Primary Examiner* — Anand Loharikar
(74) *Attorney, Agent, or Firm* — MARSHALL, GERSTEIN & BORUN LLP

(57) ABSTRACT

Systems and methods for ordering a replacement component or repair service are disclosed. According to some aspects, condition data indicating a condition of a consumable component may be generated by sensor and transmitted to an order assistance system. The order assistance system may determine whether the consumable component requires at least one of replacement or repair by comparing the condition data with one or more maintenance parameters. Additionally, in response to a determination that the consumable component requires at least one of replacement or repair, the order assistance system may recommend at least one of a replacement component or a repair service in accordance with one or more order parameters pre-selected by a user. In some aspects, an insurance policy associated with the consumable component may be adjusted based on the successful repair or replacement of the consumable component.

17 Claims, 8 Drawing Sheets

Related U.S. Application Data continuation of application No. 16/785,061, filed on Feb. 7, 2020, now Pat. No. 11,775,940, which is a division of application No. 14/850,398, filed on Sep. 10, 2015, now Pat. No. 10,565,566.

(56) References Cited

U.S. PATENT DOCUMENTS

| | | | |
|---|---|---|---|
| 8,533,144 | B1 | 9/2013 | Reeser et al. |
| 8,640,038 | B1 | 1/2014 | Reeser et al. |
| 8,665,084 | B2 | 3/2014 | Shapiro et al. |
| 8,890,680 | B2 | 11/2014 | Reeser et al. |
| 8,917,186 | B1 | 12/2014 | Grant |
| 8,976,937 | B2 | 3/2015 | Shapiro et al. |
| 9,049,168 | B2 | 6/2015 | Jacob et al. |
| 9,057,746 | B1 | 6/2015 | Houlette et al. |
| 9,117,349 | B2 | 8/2015 | Shapiro et al. |
| 9,142,119 | B1 | 9/2015 | Grant |
| 9,152,737 | B1 | 10/2015 | Micali et al. |
| 9,183,578 | B1 | 11/2015 | Reeser et al. |
| 9,202,363 | B1 | 12/2015 | Grant |
| 9,262,909 | B1 | 2/2016 | Grant |
| 9,286,772 | B2 | 3/2016 | Shapiro et al. |
| 9,311,271 | B2 | 4/2016 | Wright |
| 9,344,330 | B2 | 5/2016 | Jacob et al. |
| 9,424,737 | B2 | 8/2016 | Bailey et al. |
| 9,443,195 | B2 | 9/2016 | Micali et al. |
| 9,472,092 | B1 | 10/2016 | Grant |
| 9,589,441 | B2 | 3/2017 | Shapiro et al. |
| 9,609,003 | B1 | 3/2017 | Chmielewski et al. |
| 9,633,487 | B2 | 4/2017 | Wright |
| 9,665,892 | B1 | 5/2017 | Reeser et al. |
| 9,666,060 | B2 | 5/2017 | Reeser et al. |
| 9,699,529 | B1 | 7/2017 | Petri et al. |
| 9,739,813 | B2 | 8/2017 | Houlette et al. |
| 9,786,158 | B2 | 10/2017 | Beaver et al. |
| 9,798,979 | B2 | 10/2017 | Fadell et al. |
| 9,798,993 | B2 | 10/2017 | Payne et al. |
| 9,800,570 | B1 | 10/2017 | Bleisch |
| 9,800,958 | B1 | 10/2017 | Petri et al. |
| 9,812,001 | B1 | 11/2017 | Grant |
| 9,830,748 | B2 | 11/2017 | Rosenbaum |
| 9,888,371 | B1 | 2/2018 | Jacob |
| 9,892,463 | B1 | 2/2018 | Hakimi-Boushehri et al. |
| 9,898,168 | B2 | 2/2018 | Shapiro et al. |
| 9,898,912 | B1 | 2/2018 | Jordan et al. |
| 9,911,042 | B1 | 3/2018 | Cardona et al. |
| 9,923,971 | B2 | 3/2018 | Madey et al. |
| 9,942,630 | B1 | 4/2018 | Petri et al. |
| 9,947,202 | B1 | 4/2018 | Moon et al. |
| 9,978,033 | B1 | 5/2018 | Payne et al. |
| 9,990,782 | B2 | 6/2018 | Rosenbaum |
| 9,997,056 | B2 | 6/2018 | Bleisch |
| 10,002,295 | B1 | 6/2018 | Cardona et al. |
| 10,042,341 | B1 | 8/2018 | Jacob |
| 10,047,974 | B1 | 8/2018 | Riblet et al. |
| 10,055,793 | B1 | 8/2018 | Call et al. |
| 10,055,803 | B2 | 8/2018 | Orduna et al. |
| 10,057,664 | B1 | 8/2018 | Moon et al. |
| 10,073,929 | B2 | 9/2018 | Vaynriber et al. |
| 10,102,584 | B1 | 10/2018 | Devereaux et al. |
| 10,102,585 | B1 | 10/2018 | Bryant et al. |
| 10,107,708 | B1 | 10/2018 | Schick et al. |
| 10,142,394 | B2 | 11/2018 | Chmielewski et al. |
| 10,176,705 | B1 | 1/2019 | Grant |
| 10,181,160 | B1 | 1/2019 | Hakimi-Boushehri et al. |
| 10,186,134 | B1 | 1/2019 | Moon et al. |
| 10,192,369 | B2 | 1/2019 | Wright |
| 10,198,771 | B1 | 2/2019 | Madigan et al. |
| 10,198,879 | B2 | 2/2019 | Wright |
| 10,217,068 | B1 | 2/2019 | Davis et al. |
| 10,229,394 | B1 | 3/2019 | Davis et al. |
| 10,244,294 | B1 | 3/2019 | Moon et al. |
| 10,249,158 | B1 | 4/2019 | Jordan, II et al. |
| 10,269,190 | B2 | 4/2019 | Rosenbaum |
| 10,282,787 | B1 | 5/2019 | Hakimi-Boushehri et al. |
| 10,282,788 | B1 | 5/2019 | Jordan, II et al. |
| 10,282,961 | B1 | 5/2019 | Jordan, II et al. |
| 10,295,431 | B1 | 5/2019 | Schick et al. |
| 10,297,138 | B2 | 5/2019 | Reeser et al. |
| 10,304,313 | B1 | 5/2019 | Moon et al. |
| 10,323,860 | B1 | 6/2019 | Riblet et al. |
| 10,325,473 | B1 | 6/2019 | Moon et al. |
| 10,332,059 | B2 | 6/2019 | Matsuoka et al. |
| 10,346,811 | B1 | 7/2019 | Jordan, II et al. |
| 10,353,359 | B1 | 7/2019 | Jordan, II et al. |
| 10,356,303 | B1 | 7/2019 | Jordan, II et al. |
| 10,387,966 | B1 | 8/2019 | Shah et al. |
| 10,388,135 | B1 | 8/2019 | Jordan, II et al. |
| 10,412,169 | B1 | 9/2019 | Madey et al. |
| 10,446,000 | B2 | 10/2019 | Friar et al. |
| 10,467,476 | B1 | 11/2019 | Cardona et al. |
| 10,467,824 | B2 | 11/2019 | Rosenbaum |
| 10,480,825 | B1 | 11/2019 | Riblet et al. |
| 10,482,746 | B1 | 11/2019 | Moon et al. |
| 10,506,411 | B1 | 12/2019 | Jacob |
| 10,514,669 | B1 | 12/2019 | Call et al. |
| 10,515,372 | B1 | 12/2019 | Jordan, II et al. |
| 10,522,009 | B1 | 12/2019 | Jordan, II et al. |
| 10,546,478 | B1 | 1/2020 | Moon et al. |
| 10,547,918 | B1 | 1/2020 | Moon et al. |
| 10,565,541 | B2 | 2/2020 | Payne et al. |
| 10,573,146 | B1 | 2/2020 | Jordan, II et al. |
| 10,573,149 | B1 | 2/2020 | Jordan, II et al. |
| 10,579,028 | B1 | 3/2020 | Jacob |
| 10,586,177 | B1 | 3/2020 | Choueiter et al. |
| 10,607,295 | B1 | 3/2020 | Hakimi-Boushehri et al. |
| 10,634,576 | B1 | 4/2020 | Schick et al. |
| 10,679,292 | B1 | 6/2020 | Call et al. |
| 10,685,402 | B1 | 6/2020 | Bryant et al. |
| 10,726,494 | B1 | 7/2020 | Shah et al. |
| 10,726,500 | B1 | 7/2020 | Shah et al. |
| 10,733,671 | B1 | 8/2020 | Hakimi-Boushehri et al. |
| 10,733,868 | B2 | 8/2020 | Moon et al. |
| 10,735,829 | B2 | 8/2020 | Petri et al. |
| 10,740,691 | B2 | 8/2020 | Choueiter et al. |
| 10,741,033 | B1 | 8/2020 | Jordan et al. |
| 10,750,252 | B2 | 8/2020 | Petri et al. |
| 10,795,329 | B1 | 10/2020 | Jordan et al. |
| 10,796,557 | B2 | 10/2020 | Sundermeyer et al. |
| 10,823,458 | B1 | 11/2020 | Riblet et al. |
| 10,824,971 | B1 | 11/2020 | Davis et al. |
| 10,825,320 | B1 | 11/2020 | Moon et al. |
| 10,825,321 | B2 | 11/2020 | Moon et al. |
| 10,832,225 | B1 | 11/2020 | Davis et al. |
| 10,846,800 | B1 | 11/2020 | Bryant et al. |
| 10,922,756 | B1 | 2/2021 | Call et al. |
| 10,922,948 | B1 | 2/2021 | Moon et al. |
| 10,943,447 | B1 | 3/2021 | Jordan, II et al. |
| 10,970,990 | B1 | 4/2021 | Jacob |
| 10,990,069 | B1 | 4/2021 | Jacob |
| 11,004,320 | B1 | 5/2021 | Jordan, II et al. |
| 11,015,997 | B1 | 5/2021 | Schick et al. |
| 11,017,480 | B2 | 5/2021 | Shah et al. |
| 11,042,137 | B1 | 6/2021 | Call et al. |
| 11,042,942 | B1 | 6/2021 | Hakimi-Boushehri et al. |
| 11,043,098 | B1 | 6/2021 | Jordan, II et al. |
| 11,049,078 | B1 | 6/2021 | Jordan, II et al. |
| 11,049,189 | B2 | 6/2021 | Shah et al. |
| 11,074,659 | B1 | 7/2021 | Hakimi-Boushehri et al. |
| 11,118,812 | B1 | 9/2021 | Riblet et al. |
| 11,126,708 | B2 | 9/2021 | Reimer |
| 11,227,452 | B2 | 1/2022 | Rosenbaum |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 2003/0172072 | A1 | 9/2003 | Smith |
| 2005/0283666 | A1* | 12/2005 | Marshall .............. G06Q 10/087 714/25 |
| 2008/0313074 | A1* | 12/2008 | Placek .................. G06Q 30/00 705/39 |
| 2009/0265193 | A1 | 10/2009 | Collins et al. |
| 2011/0161119 | A1* | 6/2011 | Collins .................. G06Q 40/08 705/4 |

(56) References Cited

U.S. PATENT DOCUMENTS

| | | | | |
|---|---|---|---|---|
| 2011/0191198 | A1* | 8/2011 | Rise | G06F 3/1204 705/26.1 |
| 2014/0266669 | A1 | 9/2014 | Fadell et al. | |
| 2015/0061859 | A1 | 3/2015 | Matsuoka et al. | |
| 2015/0347910 | A1 | 12/2015 | Fadell et al. | |
| 2020/0302549 | A1 | 9/2020 | Jordan, II et al. | |
| 2020/0327791 | A1 | 10/2020 | Moon et al. | |
| 2021/0035432 | A1 | 2/2021 | Moon et al. | |
| 2021/0042843 | A1 | 2/2021 | Bryant et al. | |
| 2021/0158671 | A1 | 5/2021 | Jordan, II et al. | |
| 2022/0092893 | A1 | 3/2022 | Rosenbaum | |
| 2022/0340148 | A1 | 10/2022 | Rosenbaum | |
| 2023/0060300 | A1 | 3/2023 | Rosenbaum | |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |

* cited by examiner

SYSTEMS AND METHODS FOR ORDERING A REPLACEMENT COMPONENT OR REPAIR SERVICE

CROSS-REFERENCE TO RELATED APPLICATION

This application is a continuation of U.S. patent application Ser. No. 18/143,163, filed May 4, 2023, which is continuation of U.S. patent application Ser. No. 16/785,061, filed Feb. 7, 2020, which is a divisional of U.S. patent application Ser. No. 14/850,398, filed Sep. 10, 2015. The entirety of the foregoing is expressly incorporated herein by reference for all purposes.

FIELD OF DISCLOSURE

The present disclosure generally relates to a device, a method, and a system for monitoring a condition of a consumable component and, more particularly, facilitating the order of a replacement component or a repair service for a consumable component that is worn, depleted, defective, or otherwise having a sub-standard condition.

BACKGROUND

Appliances, vehicles, and other devices may include at least one consumable component whose lifespan may be shorter than the overall lifespan of the device. The consumable component may be subject to wear and/or depletion over time and therefore may require periodic repair or replacement. A user may be unaware that a consumable component has reached or is approaching the end of its lifespan until the consumable component fails and the device ceases to function properly or efficiently. Moreover, it may be impractical in terms of time for a user to manually inspect the consumable component(s) of every device employed by the user.

When a consumable component fails, it often takes several days or weeks for the user to repair or replace the consumable component. Factors contributing to the delay include, but are not limited to, shipping time, unavailability of the replacement component, ordering errors, installation time, time needed to solicit bids from repair service providers, scheduling conflicts, and even, in some cases, a lack of promptness on behalf of the user in ordering the replacement component or the repair service.

A device having a consumable component in need of replacement or repair may fail at an inopportune time (e.g., a furnace whose pilot light is defective may be unable to heat a home during a severe winter storm, or a vehicle whose brake pads are severely worn may be unable to stop during a high speed maneuver, etc.). Moreover, the longer it takes to repair or replace the worn, depleted, defective, or otherwise sub-standard consumable component, the higher the risk that such an event will occur.

The elevated risk associated with a worn, depleted, defective, or otherwise sub-standard consumable component may impact an insurance policy covering, or affected by, the device incorporating the consumable component. Insurance providers generally seek to offer insurance policies that take into account the likelihood of an event triggering a recognizable loss (e.g., damage to a home or vehicle covered by the policy, injury to the policy holder, injury to others, etc.). An insurance provider therefore may have an interest in knowing whether a policy holder has repaired or replaced a worn, depleted, defective, or otherwise sub-standard consumable component of a device that is covered by, or whose failure can otherwise trigger a recognizable loss under, an insurance policy. Also, the insurance provider, as well as the policy holder, may have an interest in being made aware of the worn, depleted, defective, or otherwise sub-standard condition of a consumable component so that repair activities can be begin promptly.

SUMMARY

In one aspect, a system including a monitored device and an order assistance system may be provided. The monitored device may include a consumable component, a sensor configured detect a condition of the consumable component and generate condition data, and a first communication unit coupled to the sensor and configured to transmit the condition data. The order assistance system may include a second communication unit configured to receive the condition data from the first communication unit, a processing unit, and a storage unit coupled to the processing unit. The storage unit may include non-transitory computer-readable instructions that, when executed by the processing unit, cause the processing unit to: (a) determine whether the consumable component requires at least one of replacement or repair by comparing the condition data with one or more maintenance parameters; and (b) in response to a determination that the consumable component requires at least one of replacement or repair, recommending at least one of a replacement component or a repair service in accordance with one or more order parameters pre-selected by a user.

In another aspect, a computer-implemented order assistance method may be provided. The method may include: (a) storing, in one or more memories, one or more order parameters pre-selected by a user; (b) detecting a condition of the consumable component with at least one sensor and generating condition data; (c) comparing, with one or more processors, the condition data with one or more maintenance parameters to determine whether the consumable component requires at least one of replacement or repair; and (d) in response to a determination that the consumable component requires at least one of replacement or repair, recommending at least one of a replacement component or a repair service in accordance with the one or more order parameters.

In yet another aspect, an order assistance system may be provided. The order assistance system may include a display, a wireless communication unit configured to receive condition data indicating a condition of a consumable component, a processing unit, and a storage unit coupled to the processing unit. The storage unit may include non-transitory computer-readable instructions that, when executed by the processing unit, cause the processing unit to: (a) determine whether the consumable component requires at least one of replacement or repair by comparing the condition data with one or more maintenance parameters stored in the storage unit; and (b) in response to a determination that the consumable component requires at least one of replacement or repair, recommending via the display at least one of a replacement component or a repair service in accordance with one or more order parameters pre-selected by a user.

BRIEF DESCRIPTION OF THE DRAWINGS

There are shown in the drawings arrangements which are presently discussed, it being understood, however, that the present embodiments are not limited to the precise arrangements and instrumentalities shown, wherein.

Figure 1:
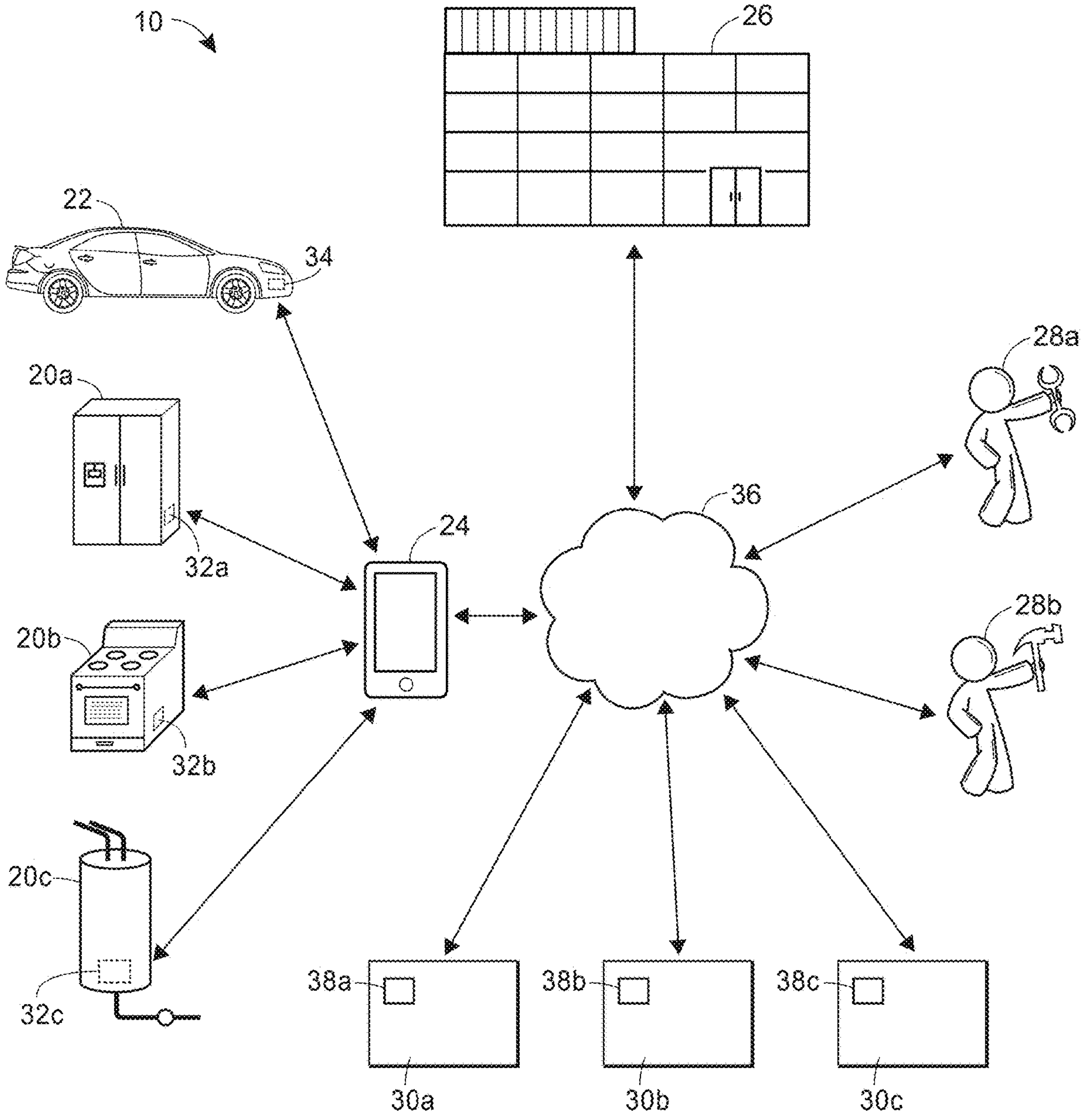
FIG. 1 illustrates an exemplary system associated with monitoring the condition of one or more consumable components in accordance with principles of the present disclosure.

The Figures depict preferred embodiments of the present invention for purposes of illustration only. One of ordinary skill in the art will readily recognize from the following discussion that alternative embodiments of the structures and methods illustrated herein may be employed without departing from the principles of the invention described herein.

DETAILED DESCRIPTION

The devices, systems, and methods disclosed herein generally relate to monitoring a condition of a consumable component and providing automated assistance for ordering a replacement component or a repair service when it is determined that the consumable component requires replacement or repair. As used herein, a "consumable component" may be any part of a device or system having a tendency to wear out, become depleted or defective, or otherwise require repair and/or replacement after a period of use. The consumable component may be a mechanical and/or electrical component of a commercial, industrial, or household appliance (e.g., a furnace, an oven, a stove, a refrigerator, an air conditioner, a sump pump, a water softener, a television, a toaster, a microwave, a water heater, a septic tank, a smoke detector, a carbon monoxide detector, a radon detector, a humidifier, a lamp, a light fixture, a personal computer, etc.), a building fixture (e.g., a chimney, a fireplace, a sprinkler system, a water pipe, etc.), a vehicle (e.g., a car, a truck, a motorcycle, etc.), or any other device or system. The automated assistance may be executed in accordance with order parameters pre-selected by a user so that little or no user input is required, besides, for example, authorizing payment to purchase the replacement component or repair service. The order parameters may reflect the preferences of the user including, for example, a preferred price range, a preferred merchant, a preferred website, a preferred repair service provider (e.g., a preferred plumber, a preferred mechanic, a preferred electrician, etc.), a preferred geographic area for locating a repair service provider, a preferred time or time period for a repair service provider to be available, a preferred aggregate consumer rating, and/or other user preferences, or even the preferences of a third party such as an insurance provider. In addition, the automated assistance may involve automatically soliciting bids from and/or coordinating (e.g., scheduling) the repair activities of one or more repair service providers, thereby alleviating the user from having to perform these potentially time-consuming tasks. Additionally, the devices, systems, and methods disclosed herein help centralize the condition data collected by one or more sensors, such that a user can receive notifications and/or warnings about the condition of one or more consumable components, and authorize remedial action, by way of a single computing system (e.g., a mobile phone, a tablet computer, a personal computer, etc.). Accordingly, the devices, systems, and methods disclosed herein may provide a user-friendly way for monitoring the condition of multiple consumable components of multiple devices and taking remedial action, thereby increasing the likelihood that user will be motivated to repair or replace a consumable component in the event that the consumable component becomes worn, depleted, defective, or otherwise sub-standard in its condition.

Furthermore, the devices, systems, and methods disclosed herein may be used to automatically track whether a user has repaired and/or replaced one or more consumable components identified to have become worn, depleted, defective, or otherwise sub-standard in their condition. An insurance provider may adjust an aspect of an insurance policy (e.g., an insurance premium, a rate, a discount, a points or rewards program, etc.) that covers, or is affected by failure or sub-standard performance of, the device incorporating the consumable component. Accordingly, more accurate levels of risk, or lack thereof, may be determined for policy holders based on their responsiveness to repair or replacement notifications provided by the disclosed devices, systems, and methods, and furthermore, insurance cost savings may be calculated and passed on to policy holders exhibiting low levels of risk.

I. Exemplary System for Monitoring One or More Consumable Components

FIG. 1 depicts an example of a system 10 associated with monitoring the condition of one or more consumable components. Although FIG. 1 depicts certain devices and components, it will be appreciated that additional or alternative devices and components are envisioned.

As illustrated in FIG. 1, the system 10 may include a plurality of interconnected devices and/or sub-systems including a plurality of appliances **20*a*, 20*b*, and 20*c*, a vehicle 22, a user computer 24, an insurance provider 26, a plurality of repair service providers 28*a* and 28*b* which sell one or more repair services, and a plurality of replacement component sellers 30*a*, 30*b*, and 30*c* which sell one or more replacement components 38*a*, 38*b*, and 38*c*. Each of the appliances 20*a*, 20*b*, and 20*c* may include a consumable component 32*a*, 32*b*, and 32*c*, and the vehicle 22 may also include a consumable component 34. In one aspect, one or more of the appliances 20*a*, 20*b*, and/or 20*c* and/or the vehicle 22 may incorporate multiple consumable components. In one aspect, each of the appliances 20*a*, 20*b*, and 20*c* and the vehicle 22 may be considered a monitored device in that the condition of their respective consumable components is monitored. The system 10 may further include a data communication network 36 that allows the user computer 24, the insurance provider 26, the plurality of repair service providers 28***a* and 28*b*, and the plurality of replacement component sellers 30*a*, 30*b*, and 30*c* to communicate data with each other. The data communication network 36 may include and/or utilize one or more of the Internet, the World Wide Web, broadband, wireless broadband, mobile broadband, broadband over power lines, Wi-Fi, cable, email, SMS messaging, local area networks, peer-to-peer networks, file sharing networks, telephony, radio, and/or any other suitable means for transmitting and receiving data. In one aspect, the system 10 may utilize a plurality of networks to communicate information between the user computer 24, the insurance provider 26, the plurality of repair service providers 28*a* and 28*b*, and the plurality of replacement component sellers 30*a*, 30*b*, and 30*c*. For example, the user computer 24 may communicate with the repair service providers 28*a* and 28*b* via telephony, whereas the user computer 24 may communicate with the replacement component sellers 30*a*, 30*b*, and 30*c* via the Internet.

One or more of the appliances 20*a*, 20*b*, and/or 20*c* and/or the vehicle 22 may be configured to communicate data directly with the user computer 24, and/or with each other, through for example, a short-range wireless communication such as a Bluetooth, Wi-Fi, and/or near field communication. Alternatively, or additionally, one or more of the appliances 20*a*, 20*b*, and/or 20*c* and/or the vehicle 22 may be configured to communicate with the user computer 24, and any other device included in the system 10, through the data communication network 36. In one aspect, one or more of the appliances 20*a*, 20*b*, and/or 20*c* and/or the vehicle 22 may communicate with the user computer 24 through broadband over power lines communication.

Each of the foregoing elements of the system 10 will now be described in more detail.

A. Exemplary Appliance Having a Consumable Component

Figure 2:
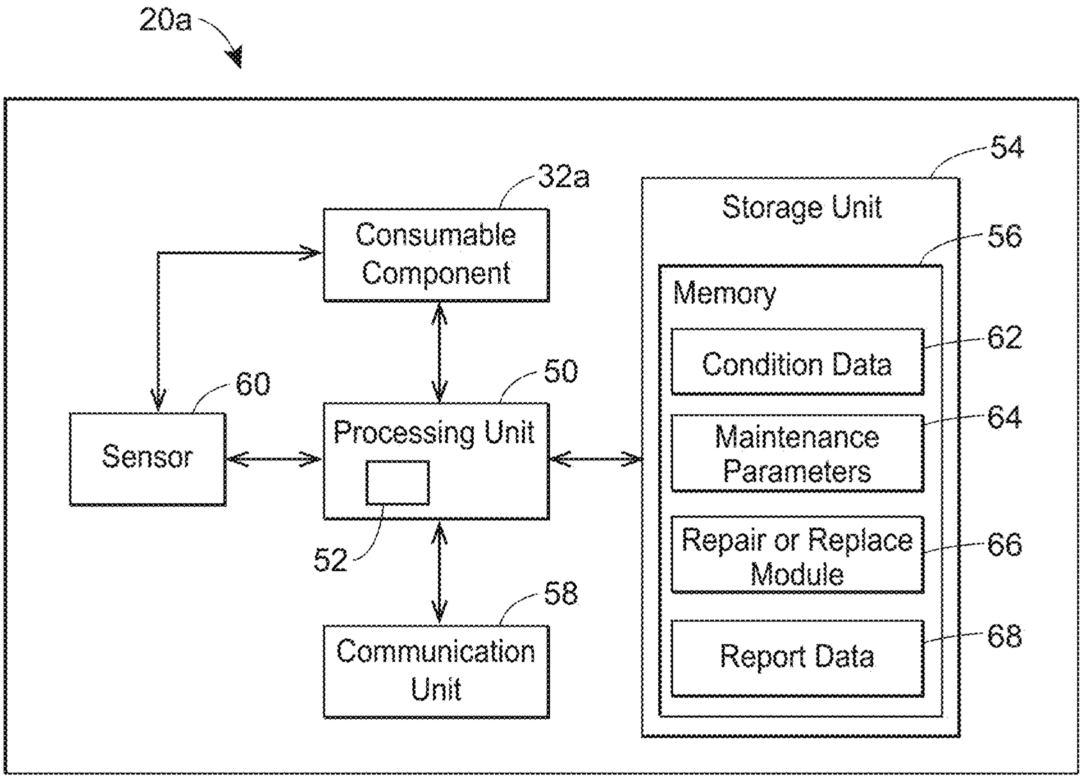
FIG. 2 depicts an exemplary configuration of an appliance incorporating one or more consumable components in accordance with principles of the present disclosure.

Referring to FIG. 2, illustrated is a block diagram of one possible configuration of the appliance 20*a*. The appliances 20*b* and 20*c* may be configured in a similar manner as the appliance 20*a*. Accordingly, the following description regarding the appliance 20*a* may also apply to the appliances 20*b* and 20*c*.

The appliance 20*a* may be any commercial, industrial, or household appliance including, for example, a furnace, an oven, a stove, a refrigerator, an air conditioner, a sump pump, a water softener, a television, a toaster, a microwave, a water heater, a dishwasher, a washing machine, a dryer, a septic tank, a smoke detector, a carbon monoxide detector, a radon detector, a humidifier, a lamp, a light fixture, a personal computer, etc. The consumable component 32*a* may be any component having a tendency to wear out, become depleted or defective, or otherwise require repair and/or replacement after a period of time. In one aspect, the consumable component 32*a* may be a component that does not necessarily require replacement, but nonetheless requires periodic maintenance or repair due to, for example, the build-up of debris (e.g., the consumable component may be a gutter that, over time, fills with leaves and therefore requires a repair service provider to remove the leaves from the gutter, or the consumable component may be a drainage pipe that, over time, becomes clogged and therefore requires a repair service provider to clear the drainage pipe, etc.). Examples of consumable components 32*a* include, but are not limited to: an air filter for a furnace; a pilot light for a furnace; an air filter for an conditioner; a water filter for a water heater or septic tank; a pilot light for a furnace, oven, stove, or water heater; a liquid or gas refrigerant for a refrigerator; a battery for a sump pump, a smoke detector, a carbon monoxide detector, a radon detector; or a personal computer; a light bulb for a lamp or other light fixture; a hose or belt for a refrigerator or a washing machine; or a compressor for a refrigerator.

The appliance 20*a* may also include a processing unit 50 having one or more processors 52 (e.g., microprocessors), a storage unit 54 having one or more tangible, non-transitory computer-readable memories 56 (e.g., a random access memory (RAM), a non-volatile memory such as a hard disk, a flash memory, a removable memory, a non-removable memory, etc.), a communication unit 58, and a sensor 60. The elements of the appliance 20*a* may communicate with each other via a system bus (not illustrated). The processing unit 50, the storage unit 54, the communication unit 58, and the sensor 60 may be discrete components or incorporated into a single component. The processing unit 50 may be configured to fetch and execute instructions stored in the storage unit 54 to control the operation of, for example, the consumable component 32*a* and/or other components of the appliance 20*a* not illustrated in FIG. 2.

The sensor 60 may be connected to and/or in communication with the consumable component 32*a*. The sensor 60 may be configured to detect a condition of the consumable component 32*a*. For example, the sensor 60 may be configured to detect a mechanical condition (e.g., temperature, stress, strain, vibration, presence or absence of water or water vapor, air pressure, sound, fluid level, etc.), an electrical condition (e.g., electrical conductivity, electrical voltage, electrical resistance, electrical current, electrical charge level, etc.), and/or an optical condition (e.g., color, fluorescence, absorbance, reflectance, scatter, polarization, etc.) of the consumable component 32*a*. In one aspect, the sensor 60 may be a timer that tracks the operational time of the consumable component 32*a*, and/or the total time since installation of the consumable component 32*a* (including both operational and non-operational time of the component 32*a*). The appliance 20*a* may include multiple sensors to detect different conditions of the consumable component 32*a* and/or multiple consumable components.

The communication unit 58 may be connected to and/or in communication with the sensor 60 via the processing unit 50. The communication unit 58 may be configured to transmit and/or receive data with another device, through wireless and/or wired communications. In one aspect, the communication unit 58 may be configured for short-range wireless communication such as Bluetooth, Wi-Fi, and/or near field communications. In another aspect, the communication unit 58 may be configured to communicate data through broadband over power lines communication. The communication unit 58 may be configured to transmit data associated with the condition of the consumable component 32*a* detected by the sensor 60, data stored in the storage unit 54, and/or any other data generated or created by the appliance 20*a*.

In one aspect, the memory 56 of the storage unit 54 may store condition data 62, one or more maintenance parameters 64, a repair or replacement module 66, and report data 68. The condition data 62 may represent the current and/or past condition of the consumable component 32*a* detected by the sensor 60. The one or more maintenance parameters 64 may correspond to one or more criterion and/or thresholds indicating that the consumable component 32*a* requires repair or replacement. The repair or replacement module 66 may include a set of instructions, that when executed by the processor 52 of the processing unit 50, compare the condition data 62 with the one or more maintenance parameters 64 to determine whether the consumable component 32*a* requires repair or replacement. If repair or replacement is determined to be necessary and/or recommended, the processor 52 may generate a repair or replace flag to be stored in the report data 68. Subsequently, the communication unit 58 may be used to transmit the report data 68, including the repair or replace flag, to the user computer 24 for alerting the user of the need to repair or replace the consumable component 32*a*.

In one aspect, the appliance 20*a* may not include a repair or replacement module 66, and the report data 68 communicated by the communication unit 58 to the user computer 24 may include only the condition data 62 for downstream analysis by the user computer 24. This configuration may lessen the processing burden on the processing unit 50 of the appliance 20*a* and thereby permit the use of a relatively simple and inexpensive processor onboard the appliance 20*a*.

As used herein, a "flag" is defined as any data or data structure that indicates the final state or outcome of one or more operations, including an operation that compares condition data (e.g., sensor data), or other data, with one or more evaluation parameters (e.g., one or more maintenance parameters).

In one aspect, the consumable component 32*a* being monitored is a battery for a smoke detector, and the condition being detected by the sensor 60 is the electrical charge of the battery. The maintenance parameter 64 may be an electrical charge level of, for example, 10 percent, or any other threshold charge level. If the electrical charge of the battery falls below this threshold charge level, a repair or replace flag may be stored by the processing unit 50 in the report data 68 and subsequently transmitted by the communication unit 58 to the user computer 24 for further analysis and/or display to the user.

B. Exemplary Vehicle Having a Consumable Component

Figure 3:
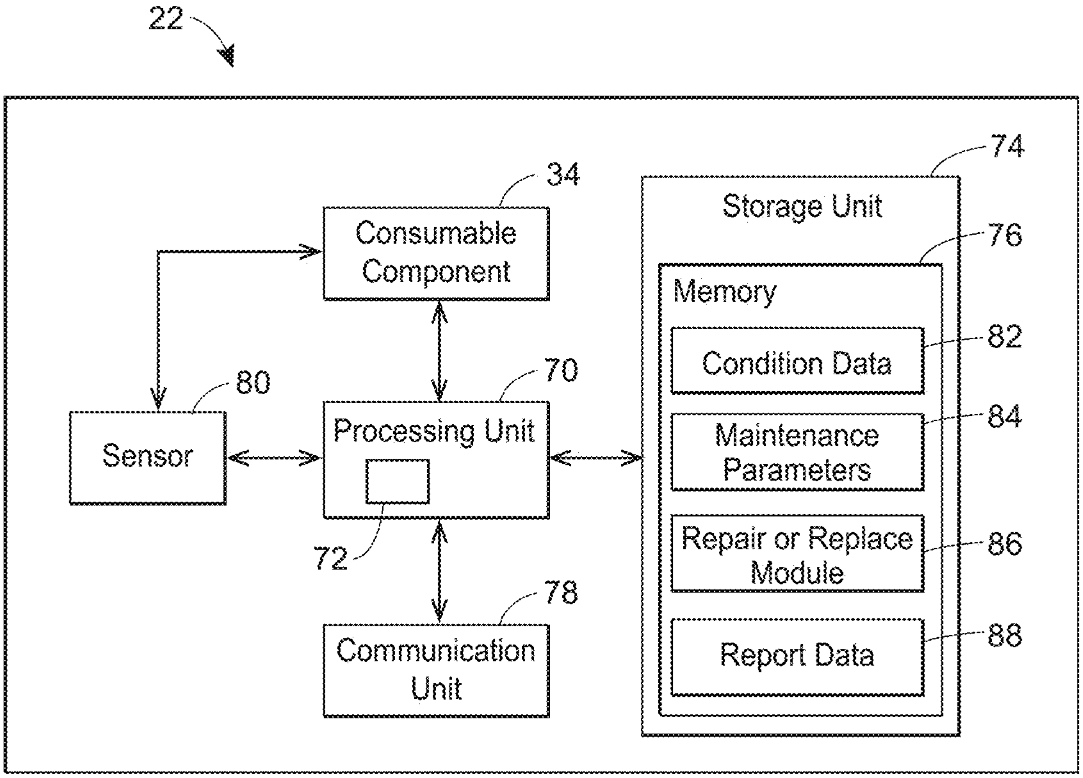
FIG. 3 depicts an exemplary configuration of a vehicle incorporating one or more consumable components in accordance with principles of the present disclosure.

Referring to FIG. 3, illustrated is a block diagram of one possible configuration of the vehicle 22. The vehicle 22 may be any means for transporting people or objects including a car, truck, motorcycle, plane, etc. The consumable component 34 may be any component having a tendency to wear out, become depleted, or otherwise require repair and/or replacement after a period of time. Examples of the consumable component 34 include a brake pad, an oil filter, oil, anti-freeze, a suspension damper, a suspension spring, a spark plug, a coolant, fuel, a transmission fluid, a fuel pump, a tire, a serpentine belt, a headlight, a taillight, a turning signal light, an airbag, a battery, a windshield wiper blades, and/or any other component of a vehicle.

The vehicle 22 may include a processing unit 70 having one or more processors 72 (e.g., microprocessors), a storage unit 74 having one or more computer-readable memories 76 (e.g., a RAM, a non-volatile memory such as a hard disk, a removable memory, a non-removable memory, etc.), a communication unit 78, and a sensor 80. The elements of the vehicle 22 may communicate with each other via a system bus (not illustrated). The processing unit 70 may correspond to an onboard computer of the vehicle 22. The processing unit 70 may be configured to fetch and execute instructions stored in the storage unit 74 to control operation of, for example, the consumable component 34 and/or other components of the vehicle 70 not illustrated in FIG. 3.

The sensor 80 may be connected to and/or in communication with the consumable component 34. The sensor 80 may be configured to detect a condition of the consumable component 34. For example, the sensor 80 may be configured to detect a mechanical condition (e.g., temperature, stress, strain, vibration, presence or absence of water or water vapor, air pressure, tire pressure, tire wear, tire cracking, break pad thickness, sound, fluid level, oil level, fuel level, etc.), an electrical condition (e.g., electrical conductivity, electrical resistance, electrical voltage, electrical current, electrical charge level, etc.), and/or an optical condition (e.g., color, fluorescence, absorbance, reflectance, scatter, polarization, etc.) of the consumable component 34. In one aspect, the sensor 80 may be a timer that tracks the operation time of the consumable component 34, or the total time since installation of the consumable component 34 (including both the operational and non-operational time of the consumable component 34). The vehicle 22 may include multiple sensors to detect different conditions of the consumable component 32*a* and/or multiple consumable components.

The communication unit 78 may be connected to and/or in communication with the sensor 80 via the processing unit 70. The communication unit 78 may be configured to transmit and/or receive data with another device, through wireless and/or wired communications. In one aspect, the communication unit 78 may be configured for short-range wireless communication such as a Bluetooth, Wi-Fi, and/or near field communications. In another aspect, the communication unit 78 may be configured to communicate data through broadband over power lines communication. The communication unit 78 may be configured to transmit data associated with the condition of the consumable component 34 detected by the sensor 80, data stored in the storage unit 74, and/or any other data generated or created by the vehicle 22.

In one aspect, the memory 76 of the storage unit 74 may store condition data 82, one or more maintenance parameters 84, a repair or replacement module 86, and report data 88. The condition data 82 may represent the current and/or past condition of the consumable component 34 detected by the sensor 80. The maintenance parameter 84 may correspond to a criterion and/or threshold that indicates that the consumable component 34 requires repair or replacement. The repair or replacement module 86 may include a set of instructions, that when executed by the processor 72 of the processing unit 70, compare the condition data 82 with the maintenance parameter 84 to determine whether the consumable component 34 requires repair or replacement. If repair or replacement is determined to be necessary and/or recommended, the processor 72 may generate a repair or replace flag for storage in the report data 88. Subsequently, the communication unit 78 may be used to transmit the report data 88, including the repair or replace flag, to the user computer 24 for notifying the user of the need to repair or replace the consumable component 34.

In one aspect, the vehicle 22 may not include a repair or replacement module 86, and the report data 88 communicated by the communication unit 78 to the user computer 24 may include only the condition data 82 for downstream analysis by the user computer 24. This configuration may lessen the processing burden on the processing unit 70 of the vehicle 22 and thereby permit the use of expensive and/or complex computer hardware onboard the vehicle 2.

In one aspect, the consumable component 34 that is monitored may be a brake pad, and the condition that is detected by the sensor 80 may be the thickness of the brake pad. The maintenance parameter 84 may be a thickness of, for example, 3 mm. If the thickness of the brake pad falls below this level, a repair or replace flag may be stored by the processing unit 70 in the report data 88 and subsequently transmitted by the communication unit 78 to the user computer 24 for further analysis and/or display to the user.

C. Exemplary User Computer

Figure 4:
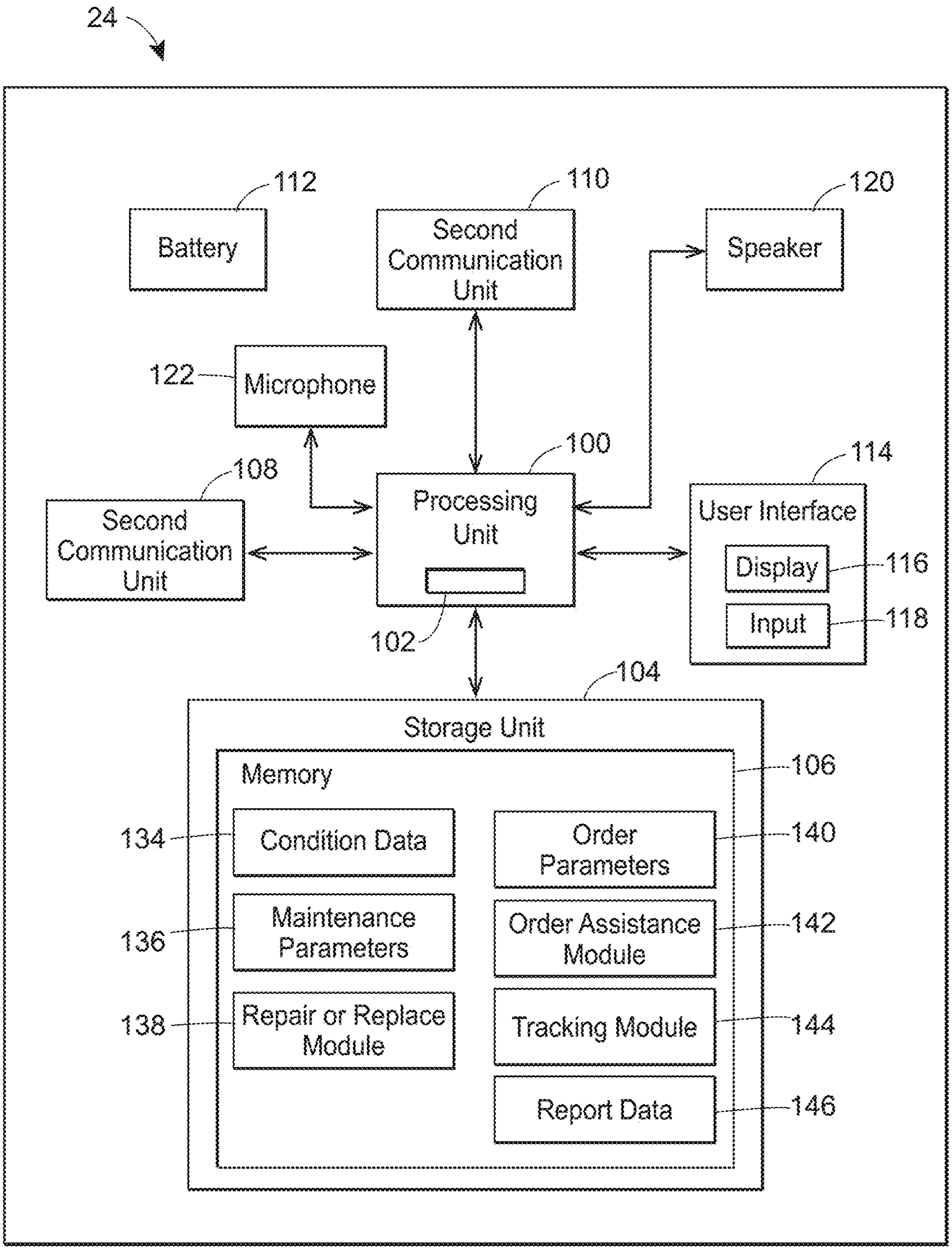
FIG. 4 depicts an exemplary configuration of a user computer in accordance with principles of the present disclosure.

Turning to FIG. 4, a block diagram of one possible configuration of the user computer 24 is depicted. The user computer 24 may be configured as a mobile telephone (e.g., a smartphone), a tablet computer, a personal computer, a smartwatch, a server, or any other suitable computing device or system, or even a cloud-based computing system. In one aspect, the user computer 24 is configured as an order assistance system. In one aspect, the user computer 24 may be remote from, and movable relative to, the appliances 20*a*, 20*b*, 20*c* and/or the vehicle 22. The user computer 24 may include a processing unit 100 having one or more processors 102 (e.g., microprocessors), a storage unit 104 having one or more tangible, non-transitory computer-readable memories 106 (e.g., a RAM, a non-volatile memory such as a hard disk, a flash memory, a removable memory, a non-removable memory, etc.), a first communication unit 108, a second communication unit 110, a battery 112, a user interface 114 having a display 116 (e.g., a touchscreen, a computer monitor, a liquid crystal display, etc.) and an input unit 118 (e.g., a physical keyboard, touchscreen keyboard, button, etc.), a speaker 120, and a microphone 122. In one aspect, a touchscreen may constitute both the display 116 and the input unit 118. The elements of the user computer 24 may communicate with each other via a system bus (not illustrated). The processing unit 100 may be configured to fetch and execute instructions stored in the storage unit 104 to control the operation of, for example, the first communication unit 108, the second communication unit 110, the user interface 114, the speaker 120, the microphone 122, and/or other components of the user computer 24 not illustrated in FIG. 4.

The first communication unit 108 may be connected to and/or in communication with the processing unit 100. The first communication unit 108 may be configured to transmit and/or receive data with the communication unit 58 of each one of the appliances 20*a*, 20*b*, and 20*c* and/or the communication unit 78 of the vehicle 22, through wireless and/or wired communications. In one aspect, the first communication unit 108 may be configured for short-range wireless communications, such as Bluetooth, Wi-Fi, and/or near field communications, with the communication unit 58 of each one of the appliances 20*a*, 20*b*, and 20*c* and/or the communication unit 78 of the vehicle 22.

In one aspect, the second communication unit 110 may be connected to and/or in communication with the processing unit 100. The second communication unit 110 may be configured to transmit and/or receive data with the insurance provider 26, the repair service providers 28*a* and 28*b*, and/or the replacement component sellers 30*a*, 30*b*, and 30*c*, through wireless and/or wired communications, over the data communication network 36. The second communication unit 110 may be configured to communicate data over long distances, as compared to the first communication unit 108, and may utilize one or more of the Internet, the World Wide Web, broadband, wireless broadband, mobile broadband, broadband over power lines, Wi-Fi, cable, email, SMS messaging, local area networks, peer-to-peer networks, file sharing networks, telephony, radio, and/or any other suitable means for transmitting and/or receiving data.

In one aspect, the memory 106 of the storage unit 104 may store condition data 134, one or more maintenance parameters 136, a repair or replacement module 138, one or more order parameters 140, an order assistance module 142, a tracking module 144, and/or report data 146. The condition data 134 may be received from the communication unit 58 of one or more of the appliances 20*a*, 20*b*, and/or 20*c* and/or the communication unit 78 of the vehicle 22. In one aspect, the condition data 134 includes the condition data 62 detected by one or more of the appliances 20*a*, 20*b*, and/or 20*c* and/or the condition data 82 detected by the vehicle 22. Accordingly, the condition data 134 may indicate the current and/or past condition of one or more of the consumable components, 32*a*, 32*b*, 32*c*, and 34. Alternatively, or additionally, the condition data 134 may include one or more repair or replace flags received from one or more of the appliances 20*a*, 20*b*, and/or 20*c* and/or the vehicle 22. This may be the case where one or more of the appliances 20*a*, 20*b*, and/or 20*c* and/or the vehicle 22 has the ability to process the condition data 62 and/or the condition data 72 by executing, for example, the repair or replacement modules 64 and 74. By contrast, in embodiments where one or more of the appliances 20*a*, 20*b*, and/or 20*c* and/or the vehicle 22 do not have the ability to analyze the process data 62 and/or data 72, the condition data 134 may include only the raw data detected by the sensor 60 of one or more of the appliances 20*a*, 20*b*, and/or 20*c* and/or the sensor 80 of the vehicle 22.

The maintenance parameters 136 may correspond to one or more criteria and/or thresholds indicating that one or more of the consumable components 32*a*, 32*b*, 32*c*, and/or 34 requires repair or replacement. The repair or replacement module 138 may include a set of instructions, that when executed by the processor 102 of the processing unit 100, compare the condition data 134 with one or more of the maintenance parameters 136 to determine whether one or more of the consumable components 32*a*, 32*b*, 32*c*, and/or 34 requires repair or replacement. If repair or replacement is determined to be necessary and/or recommended, the processor 102 may generate a repair or replace flag for storage in the report data 146 and/or execute of the order assistance module 142, as discussed below in more detail.

In general, the order parameters 140 may indicate any one of, or any combination of: a manner in which a user of one or more of the appliances 20*a*, 20*b*, and 30*c* and/or the vehicle 22 prefers and/or requires one or more of the replacement components 38*a*, 38*b*, and 38*c* and/or the repair service to be obtained (e.g., purchased, delivered, shipped, ordered, etc.); an aspect of one or more of the replacement components 38*a*, 38*b*, and 38*c* and/or the repair service that is preferred and/or required by the user; and/or an aspect of the source (e.g., a seller) of one or more of the replacement components 38*a*, 38*b*, and 38*c* and/or the repair service that is preferred and/or required by the user. The order parameters 140 may be pre-selected in the sense that they are selected by the user, and optionally saved in the memory 106, or some other data storage system, prior to the determination that one or more of the consumable components 32*a*, 32*b*, 32*c*, and/or 34 requires repair or replacement. The user may save the order parameters 140 in the memory 104 by inputting them through the input unit 118 of the user interface 114.

Examples of the order parameters 140 include, but are not limited to, any one of, or any combination of: a website for ordering the replacement component or the repair service (e.g., Amazon.com, Angieslist.com, Jiffylube.com, Autopartswarehouse.com, etc.); a telephone number for contacting a user-preferred replacement component seller and/or a user-preferred repair service provider (e.g., a mechanic, a plumber, an electrician, etc.); a user-preferred price range for the replacement component or the repair service; a user-preferred delivery time; a user-preferred geographic area for locating a repair service provider; a user-preferred time period for a repair service provider to be available (e.g., between the hours of 4:00 pm-6:00 pm, on the weekend, within the next 3 days, etc.); a user-preferred minimum aggregate consumer rating for one or more of the replacement components 38*a*, 38*b*, and/or 38*c* (e.g., at least 4 out of 5 star consumer rating listed on Amazon.com, a top tier ranking by Consumer Reports, an A-grade from the Better Business Bureau, etc.); a user-preferred minimum aggregate consumer rating for one or more of the repair service providers 28*a* and/or 28*b* (e.g., at least 4 out of 5 star consumer rating listed on Angieslist.com, a top tier ranking by Consumer Reports, an A-grade from the Better Business Bureau, etc.).

The order assistance module 142 may include a set of instructions that when executed by the processing unit 100 cause the processing unit 100 to assist the user in ordering one or more of the replacement components 38*a*, 38*b*, and/or 38*c* from one or more of the replacement component sellers 30*a*, 30*b*, and/or 30*c* and/or ordering one or more of the repair services from one or more of the repair service providers 28*a* and/or 28*b* based on one or more of the order parameters 140. Examples of algorithms that may be employed by the order assistance module 142 to provide the automated ordering assistance are described below in more detail.

In general, the order assistance module 142 may cause the processing unit 100 to notify or alert the user of the worn, depleted, defective, or otherwise sub-standard condition of one or more of the consumable components 32*a*, 32*b*, 32*c*, and/or 34, and subsequently, in accordance with the order parameters 140, gather and/or organize relevant information from one or more of the replacement component sellers 30*a*, 30*b*, and/or 30*c* and/or one or more of the repair service providers 28*a* and 28*b* about one or more of the replacement components 38*a*, 38*b*, and 38*c* and/or one or more of the repair services. Then, the order assistance module 142 may cause the processing unit 100 to present the relevant information to the user through, for example, the display 116 of the user interface 114, an email, an alert sound, an alert vibration, and/or a push notification, or through any other suitable notification method. The user may subsequently authorize the purchase and/or acquisition of one or more of the replacement components 38*a*, 38*b*, and/or 38*c*, and/or one or more repair services, by making a selection through the input unit 118 of the user interface 114, and/or through any other selection means.

In one aspect, the order assistance module 142 may cause the processing unit 100 to automatically order, without input from the user after the need for the replacement component and/or repair service has been identified, one or more of the replacement components 38*a*, 38*b*, and/or 38*c* and/or one or more of the repair services by directly contacting one or more of the replacement component sellers 30*a*, 30*b*, and/or 30*c* and/or one or more of the repair service providers 28*a* and 28*b* with the second communication unit 110 via, for example, the Internet, the World Wide Web, broadband, wireless broadband, mobile broadband, broadband over power lines, Wi-Fi, cable, email, SMS messaging, local area networks, peer-to-peer networks, file sharing networks, telephony, radio, and/or any other suitable communication protocol. In one aspect, the order assistance module 142 may cause the processing unit 100 to automatically solicit bids (e.g., quotes) from one or more of the replacement component sellers 30*a*, 30*b*, and/or 30*c* for one or more of the replacement components 38*a*, 38*b*, and/or 38*c*, and/or solicit bids from one or more of the repair service providers 28*a* and/or 28*b* for one or more of the repair services. In one aspect, the order assistance module 142 may cause the processing unit 100 to send a message (e.g., email, telephone, SMS message, voicemail, etc.) to one or more of the replacement component sellers 30*a*, 30*b*, and/or 30*c* and/or one or more of the repair service providers 28*a* and 28*b* via the second communication unit 110. The message may provide a description of the desired replacement component and/or the desired repair service. Additionally, the message may request a quote. Then, the order assistance module 142 may cause the processing unit 100 to gather one or more responses (e.g., a bid including an offer price, a target delivery time, and/or a target appointment time for one or more of the repair services, etc.) from one or more of the replacement component sellers 30*a*, 30*b*, and/or 30*c* and/or one or more of the repair service providers 28*a* and/or 28*b*. Subsequently, the order assistance module 142 may cause the processing unit 100 to display a list and/or menu of the responses from one or more of the replacement component sellers 30*a*, 30*b*, and/or 30*c* and/or one or more of the repair service providers 28*a* and/or 28*b*, and display the responses to the user through the display 116 of the user interface 114. Additionally, the order assistance module 142 may save an order completion flag in the report data 146 after the order for one or more of the replacement components 38*a*, 38*b*, and 38*c* and/or one or more of the repair services has been placed, and/or after the user has authorized payment for one or more of the replacement components 38*a*, 38*b*, and 38*c* and/or one or more of the repair services.

The tracking module 144 may include a set of instructions that when executed by the processing unit 100 cause the processing unit 100, in general, to track whether one or more of the consumable components 32*a*, 32*b*, 32*c*, and/or 34 has been repaired or replaced after the determination that such remedial action is necessary and/or recommended. Examples of algorithms that may be employed by the tracking module 144 are described below in more detail. In one aspect, the tracking module 144 may cause the processing unit 100 to check whether an order completion flag has been stored in the report data 146, and if not, periodically remind the user to take appropriate remedial action. The reminders may be provided through, for example, the display 116 of the user interface 114, an email, an alert sound, an alert vibration, a push notification, and/or through any other suitable notification method.

In one aspect, the tracking module 144 may cause the processing unit 100 to check whether the repair or replace flag for one or more of the consumable components 32*a*, 32*b*, 32*c*, and/or 34 has been removed after the completion of an order for one or more of the replacement components 38*a*, 38*b*, and 38*c* and/or one or more of the repair services. If the repair or replace flag has not been removed after a certain period of time, and/or if the order completion flag is not stored in the report data 146 after a certain period of time, the tracking module 144 may cause the processing unit 100 to store a failure to repair or replace flag in the report data 146. In addition to storing the failure to repair or replace flag in the report data 146, the tracking module 144 may cause the processing unit 100 to store reminder history information in the report data 146 indicating, for example, the number of reminders that the tracking module 144 had provided to the user after repair or replacement was determined to be necessary and/or recommended.

Additionally, in the event that the repair or replace flag was removed after the order was placed for one or more of the replacement components 38*a*, 38*b*, and/or 38*c* and/or one or more of the repair services, the tracking module 144 may cause the processing unit 100 to store a repair completion flag in the report data 146 indicating that repair of the consumable component was successful, as well as, store repair time information in the report data 146 indicating the amount of time between the determination that repair or replacement was necessary and/or recommended and the determination that repair or replacement was successful. Subsequently, the tracking module 144 may cause the processing unit 100 to control the second communication unit 110 to transmit the failure to repair or replace flag, the order completion flag, the repair and replace flag, the reminder history information, the repair time information, and/or other items stored in the report data 146, and/or the condition data 134, to the insurance provider 26 through the network 38.

D. Exemplary Insurance Provider

Figure 5:
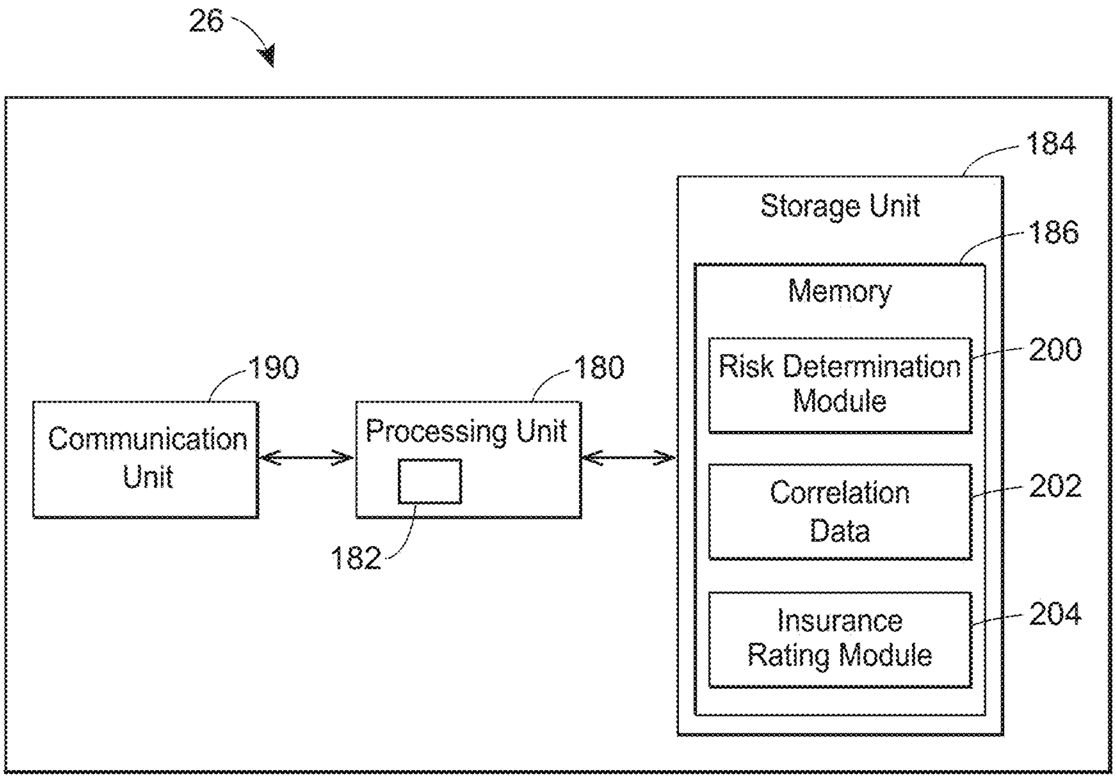
FIG. 5 depicts an exemplary configuration of a data analysis system of insurance provider in accordance with principles of the present disclosure.

Referring to FIG. 5, depicted is a block diagram of one possible configuration of a data analysis system 170 associated with the insurance provider 26. In one aspect, the data analysis system 170 may be configured to perform various functions, including analyzing the report data 146 received from the user computer 24. The data analysis unit 170 may be distributed across one or more computing systems (e.g., servers) which are remote from the user computer 24 and which may be owned, operated, and/or controlled by the insurance provider 26 and/or other entities. In one aspect, the data analysis system 170 may be a cloud-based computing system.

The data analysis system 170 may include a processing unit 180 having one or more processors 182 (e.g., microprocessors), a storage unit 184 having one or more tangible, non-transitory computer-readable memories 186 (e.g., a RAM, a non-volatile memory such as a hard disk, a flash memory, a removable memory, a non-removable memory, etc.), and a communication unit 190. In one aspect, the elements of the data analysis system 170 may communicate with each other via a system bus (not illustrated). The processing unit 180 may be configured to fetch and execute instructions stored in the storage unit 184 to control the operation of one or more elements of the data analysis system 170.

The communication unit 190 may be connected to and/or in communication with the processing unit 180. The communication unit 190 may be configured to transmit and/or receive data (e.g., report data 146) with the user computer 24, and other elements of the system 10, through wireless and/or wired communications, over the data communication network 36. The communication unit 190 may be configured to utilize one or more of the Internet, the World Wide Web, broadband, wireless broadband, mobile broadband, broadband over power lines, Wi-Fi, cable, email, SMS messaging, local area networks, peer-to-peer networks, file sharing networks, telephony, radio, and/or any other suitable means for transmitting and receiving data.

In one aspect, the memory 186 of the storage unit 184 may store a risk determination module 200, correlation data 202, and an insurance rating module 204. In one aspect, the risk determination module 200 may include a set of instructions that when executed by the processing unit 180 cause the processing unit 180 to determine risk indicators based upon a comparison of the report data 146 and the correlation data 202. The correlation data 202 may include data modeling correlations between the following: (a) patterns related to the promptness of the user in authorizing an order for, installing, and/or scheduling a replacement component or a repair service following a notification that a consumable component requires repair or replacement, patterns related to a confirmation that a consumable component has been repaired or replaced following a determination that repair or replacement is necessary and/or recommended, and/or patterns related to the frequency of a determination that a consumable component requires repair or replacement; and (b) likelihoods of incurring recognizable losses under an insurance policy covering, or affected by, one or more devices incorporating one or more of the consumable components. The correlation data 202 may be based upon manually entered information and/or learned by the insurance provider 26 (and/or other computer system(s) not depicted in FIG. 5) based upon historical claims data collected by the insurance provider 26 about a group of policy holders. In one aspect, the correlation data 202 may include a relational database, for example, with a plurality of percentage ranges each corresponding to a different indicator of a likelihood of loss.

As an example, the risk determination module 200, when executed by the processing unit 180, may compare the failure to repair or replace flag included in the report data 146 with one or more percentage ranges identified by the correlation data 202 (e.g., 0-10 percent, 11-25 percent, etc.), and determine a risk indicator that corresponds to the matching percentage range. As another example, the risk determination module 200, when executed by the processing unit 180, may compare an order completion flag included in the report data 146 with one or more percentage ranges identified by the correlation data 202 (e.g., 0-10 percent, 11-25 percent, etc.), and determine a risk indicator that corresponds to the matching percentage range.

Once the risk indicators are determined by the risk determination module 200, the risk indicators may be provided to the insurance rating module 204, which may also be part of the data analysis system 170. The insurance rating module 204 may include a set of instructions capable of causing the processor 182 to determine an insurance rating for the device incorporating the consumable component, another device that could be damaged by failure of the device incorporating the consumable component, and/or a user of the device incorporating the consumable component. The insurance rating may in turn be provided to a billing unit (not shown) that is configured to determine premiums, rates, discounts, a points or rewards program, or other financial aspects of an insurance policy covering, or affected by, the device incorporating the consumable component.

In one aspect, after determining the insurance rating and/or insurance premium, the insurance provider 26 may transmit data indicative of the insurance rating and/or insurance premium via the communication unit 190 over the network 36 to the user computer 24 for display to the user via the display 116 of the user interface 114.

II. Exemplary Order Assistance Method

Figure 6:
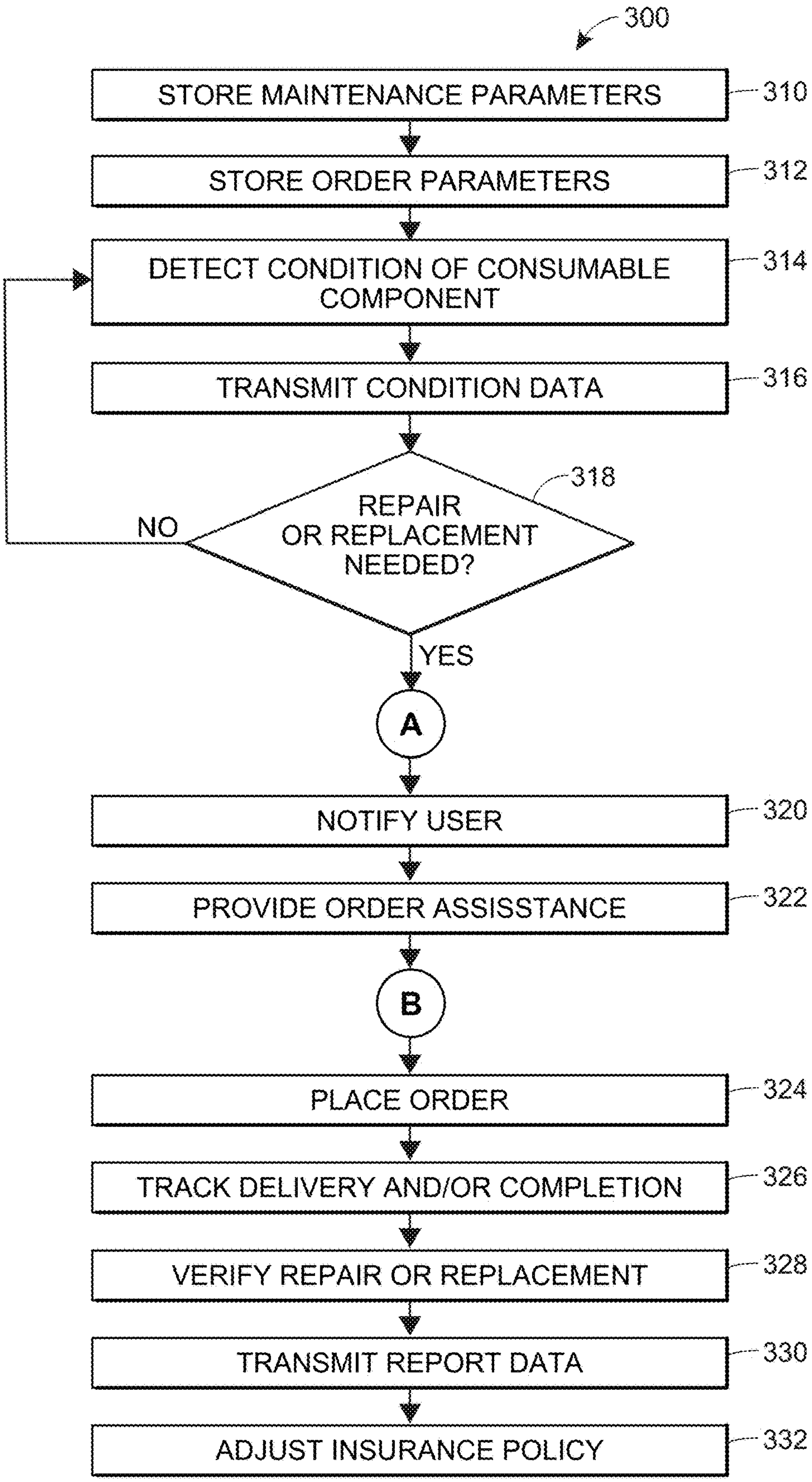
FIG. 6 is flow diagram of an exemplary method of monitoring one or more consumable components in accordance with principles of the present disclosure.

FIG. 6 is a flow diagram of an exemplary method 300 of monitoring one or more consumable components (e.g., one or more of the consumable components 32*a*, 32*b*, 32*c*, and/or 34) of one or more devices (e.g., one or more of the appliances 20*a*, 20*b*, and/or 20*c* and/or the vehicle 22) and providing assistance in ordering at least one of a replacement component (e.g., one or more of the replacement components 38*a*, 38*b*, and/or 38*c*) or a repair service. The method 300 may be implemented, in whole or in part, on one or more devices or sub-systems of the system 10 illustrated in FIG. 1. For instance, the method may be implemented, in whole or in part, by one or more of the appliances 20*a*, 20*b*, 20*c*, the vehicle 22, the user computer 24, and/or the insurance provider 26. In one aspect, method 300 may be saved, in whole or in part, as a set of instructions, routines, programs, modules, and/or applications on one or more memories such as one or more of the memories 56, 76, 106, and/or 186. In one aspect, the method 300 is implemented, in whole or in part, by an application (e.g., an "app") stored in the memory of a mobile telephone (e.g., a smartphone) used as the user computer 24.

The method 300 may begin by storing one or more of the maintenance parameters 64, 84, and/or 136 in one or more of the memories 56, 76, and/or 106 (block 310). In one aspect, one or more of the maintenance parameters 64, 84, and/or 136 may be inputted by a user through the input unit 118 of the user interface 114 of the user computer 24. Alternatively, a manufacturer of one or more of the appliances 20*a*, 20*b*, and/or 20*c* and/or the vehicle 22 may save one or more of the maintenance parameters 64 and/or 84 in one or more of the memories 56 and 76. As discussed above, one or more of the maintenance parameters 64, 84, and/or 136 may correspond to a criterion and/or threshold indicating that one or more of the consumable components 32*a*, 32*b*, 32*c*, and/or 34 requires repair or replacement (e.g., a charge level of a battery, an efficiency level, etc.).

Next the method 300 may store the order parameters 140 in the memory 106 of the user computer 24 (block 312). In one aspect, the order parameters 140 may be inputted by a user through the input unit 118 of the user interface 114 of the user computer 24. As discussed above, the order parameters 140 may indicate any one, or any combination of: a manner in which a user of one or more of the appliances 20*a*, 20*b*, and/or 30*c* and/or the vehicle 22 prefers or requires the one or more of the replacement components 38*a*, 38*b*, and/or 38*c* or the repair service to be obtained (e.g., purchased, delivered, shipped, ordered, etc.); an aspect of one or more of the replacement components 38*a*, 38*b*, and/or 38*c* and/or the repair service that is preferred or required by the user; and/or an aspect of a source (e.g., a seller, merchant, etc.) of one or more of the replacement components 38*a*, 38*b*, and/or 38*c* and/or the repair service that is preferred or required by the user.

Subsequently, the method 300 may detect a condition of one or more of the consumable components 32*a*, 32*b*, 32*c*, and/or 34 with the sensor 60 of one or more of the appliances 20*a*, 20*b*, and/or 20*c* and/or the sensor 80 (block 314). In one aspect, the sensor 60 of one or more of the appliances 20*a*, 20*b*, and/or 20*c* and/or the sensor 80 of the vehicle 22 are used to continuously monitor, respectively, the condition of one or more of the consumable components 32*a*, 32*b*, 32*c*, and/or 34. Accordingly, a change in the condition of one or more of the consumable components 32*a*, 32*b*, 32*c*, and 34 can be detected promptly and automatically. The method 300 may include storing the detected condition of one or more of the consumable components 32*a*, 32*b*, 32*c*, and/or 34 as the condition data 62 and/or the condition data 82 in memories 56 and/or 76.

Next, the method 300 may transmit the condition data 62 and/or the condition data 82 from the communication unit 38 of one or more of the appliances 20*a*, 20*b*, and/or 20*c* and/or the communication unit 58 of the vehicle 22 to the first communication unit 108 of the user computer 24 for further analysis (block 316). The transmission of the condition data 62 and/or the condition data 82 may be accomplished through a short-range wireless communication such Bluetooth, Wi-Fi, and/or near field communications. Alternatively, or additionally, the transmission of the condition data 62 and/or the condition data 82 may be accomplished through broadband over power lines communication. In such a configuration, the communication unit 38 and/or the communication unit 58 may incorporate a broadband over power line modem. In one aspect, the condition data 62 and/or the condition data 82 may transmitted together with other data (e.g., the report data 68 and/or the report data 88) from one or more of the appliances 20*a*, 20*b*, and/or 20*c* and/or the vehicle 22 to the user computer 24. Furthermore, the transmission may be conducted, in whole or in part, over the network 36, and the user computer 24 may receive the transmission with its second communication unit 110.

Next, the method 300 may compare the condition of one or more of the consumable components 32*a*, 32*b*, 32*c*, and/or 34 with one or more of the maintenance parameters 64, 84, and/or 136 to determine whether one or more of the consumable components 32*a*, 32*b*, 32*c*, and/or 34 requires repair or replacement (block 318). In one aspect, this comparison may be performed by executing the repair or replacement module 138 stored in the memory 106 of the user computer 24. If it is determined that repair or replacement of one or more of the consumable components 32*a*, 32*b*, 32*c*, and/or 34 is not required and/or not recommended, the method 300 may return to block 314 and continue to monitor the condition of one or more of the consumable components 32*a*, 32*b*, 32*c*, and/or 34. On the other hand, if it is determined that repair or replacement of one or more of the consumable components 32*a*, 32*b*, 32*c*, and/or 34 is required and/or recommended, the user computer 24 may store a repair or replace flag in the report data 146 of the memory 106, and then proceed to present the user of one or more of the appliances 20*a*, 20*b*, and/or 20*c* and/or the vehicle 22 with a notification of the need to repair and/or replace one or more of the consumable components 32*a*, 32*b*, 32*c*, and 34 (block 320). The notification may be conveyed to the user through, for example, via the display 116 of the user interface 114 of the user computer 24, an email, an alert sound, an alert vibration, and/or a push notification, or through any other suitable notification method.

Figure 7:
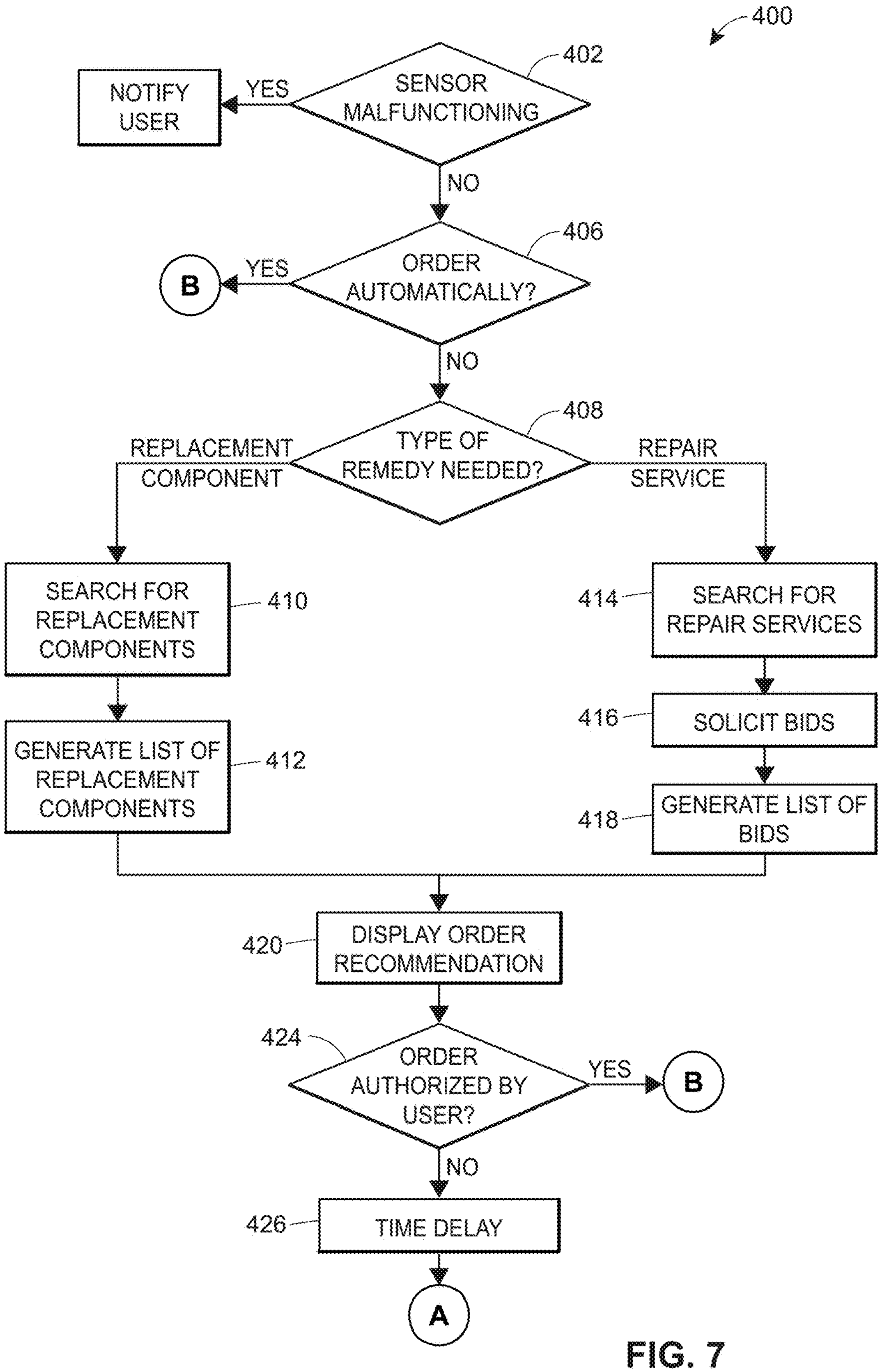
FIG. 7 is flow diagram of an exemplary method of executing an order assistance module in accordance with principles of the present disclosure.

After notifying the user of the need for repair or replacement, the method 300 may execute the order assistance module 142 stored in the memory 106 of the user computer 24 is executed (block 322). Execution of the order assistance module 142 may involve performing steps of the sub-method 400 illustrated in FIG. 7. The sub-method 400 may begin with determining whether the sensor (e.g., the sensor 60 of one or more of the appliance 20*a*, 20*b*, and/or 20*c*, the sensor 80 of the vehicle 22, etc.) is malfunctioning (block 402). This may involve an evaluation of how frequently the sensor detects a sub-standard condition of one or more of the consumable components 32*a*, 32*b*, 32*c*, and/or 34. If it is determined that the sensor is malfunctioning, the sub-method 400 may provide the user with a notification (e.g., via the display 116 of the user interface 114 of the user computer 24) indicating that the sensor requires repair or replacement and/or that the earlier notification of the need for repair or replacement was in error (block 404). If the sensor is determined to be operating properly, the sub-method 400 may proceed to block 406.

At block 406, the sub-method 400 may evaluate whether one or more of the replacement components 38*a*, 38*b*, and/or 38*c* and/or the repair service should be ordered automatically without input from the user. If so, the sub-method 400 may proceed to block 324 of FIG. 6 to place the order for one or more of replacement components 38*a*, 38*b*, and/or 38*c* and/or the repair service based on one or more of the order parameters 140. If not, the sub-method 400 may proceed to block 408.

At block 408, the sub-method 400 may involve making a determination of whether a replacement component or a repair service is needed to fix the consumable component having a sub-standard condition. This determination may be based on one or more of the order parameters 140. If a replacement component is needed, the sub-method 400 may proceed to block 410, where the user computer 24 automatically collects information about one or more potential replacement components that satisfy the criteria of the order parameters 140 that have been pre-selected by the user. In one aspect, the user computer 24 may search, via a web browser for example, websites on the Internet that are operated by one or more replacement component sellers in order to identify one or more potential replacement components that meet the criteria of one or more of the order parameters 140. In one aspect, where the order parameters 140 indicate a user-preferred price range for the replacement component and indicate that the user-preferred merchant is Amazon.com, the user computer 24 may search Amazon.com for one or more potential replacement components having a price within the user-preferred price range. After collection of the information about one or more potential replacement components, the sub-method 400 may proceed to block 412 where the user computer 24 generates a list of the one or more potential replacement components identified in the search.

On the other hand, if a repair service is needed, the sub-method 400 may proceed to block 414, where the user computer 24 automatically collects information about one or more repair service providers that satisfy the criteria of the order parameters 140 that have been pre-selected by the user. In one aspect, the user computer 24 may search, via a web browser for example, websites on the Internet that are operated by one or more repair service providers in order to identify one or more potential replacement components that satisfy the criteria of one or more of the order parameters 140. In one aspect, the user computer 24 may search the Internet for repair service providers located within a 5-mile radius of the user and/or having availability between the hours of 4:00-6:00 pm. After identification of one or more potential repair service providers, the sub-method 400 may proceed to block 414 where the user computer 24 may automatically solicit bids from the one or more potential repair service providers. In one aspect, the solicitation of bids may involve the user computer 24 sending a message (e.g., an email, SMS message, voicemail, etc.) to the one or more potential repair service providers. The message may include a description (e.g., a serial number) of the consumable component in need of repair, request a price quote for the repair service, inquire about the availability of repair service provider, and/or inform the repair service provider of the timeframe preferred by the user. After soliciting the bids and receiving replies from the one or more potential repair service providers, the sub-method 400 may proceed to block 418 where the user computer 24 generates a list of the bids from one or more of the potential repair service providers.

Next, the sub-method 400 may proceed to block 420 where the user computer 24 displays an order recommendation to the user that includes, for example, an order menu including the list of the one or more potential replacement components generated at block 412 and/or an order menu including the list of bids of the one or more potential repair service providers generated at block 418. The order menu may be displayed on the display 116 of the user computer 24. The order menu may allow the user to select (e.g., order, authorize payment for, authorize delivery, and/or schedule time for repair service, etc.) one or more of the replacement components and/or one or more of the repair services, which may be displayed as separate items on the order menu. In one aspect, where the display 116 is a touchscreen, the user may select the desired replacement component(s) and/or repair service(s) by touching the corresponding item displayed on the display 116. In one aspect, the order menu may be included as part of the notification presented to the user at block 320 of the method 300. In one aspect, the order menu may include an item for selection that allows the user to indicate that he or she would like to ignore the notification that the consumable component requires repair or replacement and/or indicate that he or she would like to be reminded at a later time about the need to repair or replace the consumable component.

Figure 8:
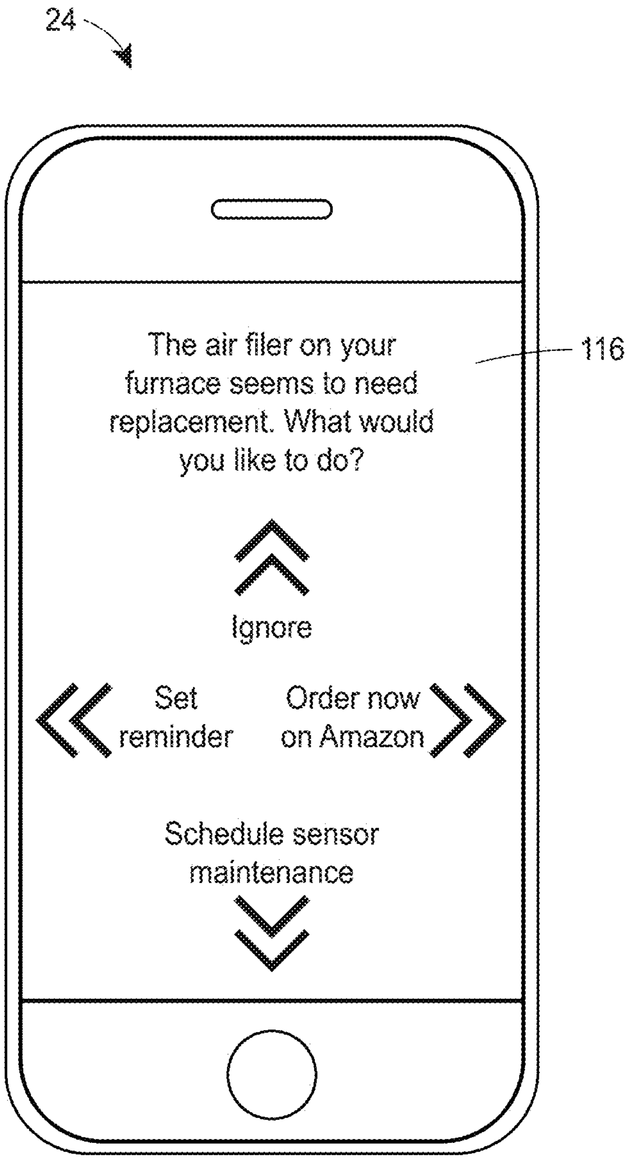
FIG. 8 is an exemplary screen for display on a user computer in accordance with principles of the present disclosure.

In one aspect, the notification of the need for repair or replacement (block 402), and the order recommendation (block 418), may be displayed on a single screen at the display 116 of the user computer 24, as depicted in FIG. 8. This figure illustrates that the notification of the need for repair or replacement is displayed near the top of the screen and states: "The air filter on your furnace seems to need replacement. What would you like to do?" The order recommendation is displayed near the middle of the screen and states: "Order now on Amazon." In embodiments where the display 116 is a touchscreen, the order recommendation may be a selectable option that can be accepted by the user by touching the region of the screen displaying the recommendation. By accepting the order recommendation, the user may authorize payment and/or placement of an order for the replacement component and/or the repair service. In addition to the order recommendation, the screen may display other selectable options such as scheduling sensor maintenance, setting a reminder to remind the user to order the replacement component and/or repair service at a future time, and/or an option to ignore the notification of the need for repair or replacement, as seen in FIG. 8.

Subsequently, the sub-method 400 may determine whether the user has selected a replacement component or repair service to be ordered (block 424). If so, the sub-method 400 may proceed to block 324 of FIG. 6. If not, the sub-method 400 may proceed to block 426 where a time delay is executed, after which the user is presented with a reminder notification of the need for repairing or replacing the consumable component (block 320), followed by the execution of the automated ordering assistance module 142 again. In one aspect, if the user chooses not to place an order for the replacement component or the repair service and/or chooses to be reminded at a later date, the user computer 24 may store a failure to repair or replace flag in the report data 146 of the memory 106. In addition, the user computer 24 may store reminder history information in the report data 146 of the memory 106 indicating, for example, how many times the user was reminded to repair or replace the consumable component.

Referring to FIG. 6, if the user has authorized the order of the replacement component or repair service at block 424, the method 300 may proceed to block 324 where the user computer 24 places an order for the replacement component or the repair service selected by the user from the order menu. The user computer 24 may place an order by transmitting an order confirmation over the network 36 to one or more of the replacement component sellers **30*a*, 30*b*, and/or 30*c* and/or one or more of the repair service providers 28*a* and 28*b*. In one aspect, the user computer 24 may place an order for a replacement component through Amazon.com. This step may also involve the user computer 24 storing an order completion flag in the report data 146 of the memory 106**.

Subsequently, at block 326, the user computer 24 may track whether the replacement component has been delivered to the user and/or whether the repair service has been completed by the repair service provider. In one aspect, the user computer 24 may analyze a delivery confirmation email from the replacement component seller or a delivery service and/or analyze a follow-up email from a repair service provider who has completed the repair service. In one aspect, the user computer 24 may store a delivery confirmation or service completion flag in the report data 146 of the memory 106 after it is determined that the replacement component has been delivery and/or the repair service completed.

Next, the method may proceed to block 328, where the user computer 24 may verify that the consumable component(s) has been repaired and/or replaced. In one aspect, this step may involve the user computer 24 analyzing the condition data 62 and/or the condition data 82 received from one or more of the appliances 20*a*, 20*b*, and/or 20*c* and/or the vehicle 22 after the confirmation of delivery of the replacement component and/or the completion of the repair service. In one aspect, this analysis may include comparing the condition data 62 and/or the condition data 82 with one or more of the maintenance parameters 136 stored in the memory 106. In one aspect, this comparison may be performed by executing the repair or replacement module 138 stored in the memory 106 of the user computer 24. If it is determined that repair or replacement is still required and/or recommended, the user computer 24 may store a failure to repair or replace flag in the report data 146 of the memory 106. On the other hand, if it is determined that repair or replacement is no longer required, the user computer 24 may store a successful repair or replacement flag in the report data 146 of the memory 106. In addition, the user computer 24 may store repair time information in the report data 146 of the memory 106 that indicates the amount of time between the determination that repair or replacement was necessary (at block 318) and the determination that repair or replacement was successful (at block 328).

Subsequently, at block 330 of the method 300, the computer 24 may transmit the condition data 134 and/or the report data 146 stored in the memory 106 to the insurance provider 26. In one aspect, the second communication unit 110 of the computer 24 may transmit the condition data 134 and/or the report data 146 over the network 36 in a manner utilizing one or more of the Internet, the World Wide Web, broadband, wireless broadband, mobile broadband, broadband over power lines, Wi-Fi, cable, email, SMS messaging, local area networks, peer-to-peer networks, file sharing networks, telephony, radio, and any other suitable communication protocol. The report data 146 that is transmitted to the insurance provider 26 may include, as described above, one or more of the repair or replace flag, the order completion flag, the failure to repair or replace flag, the successful repair or replacement flag, the delivery confirmation or service completion flag, the reminder history information, and/or the repair time information.

Figure 9:
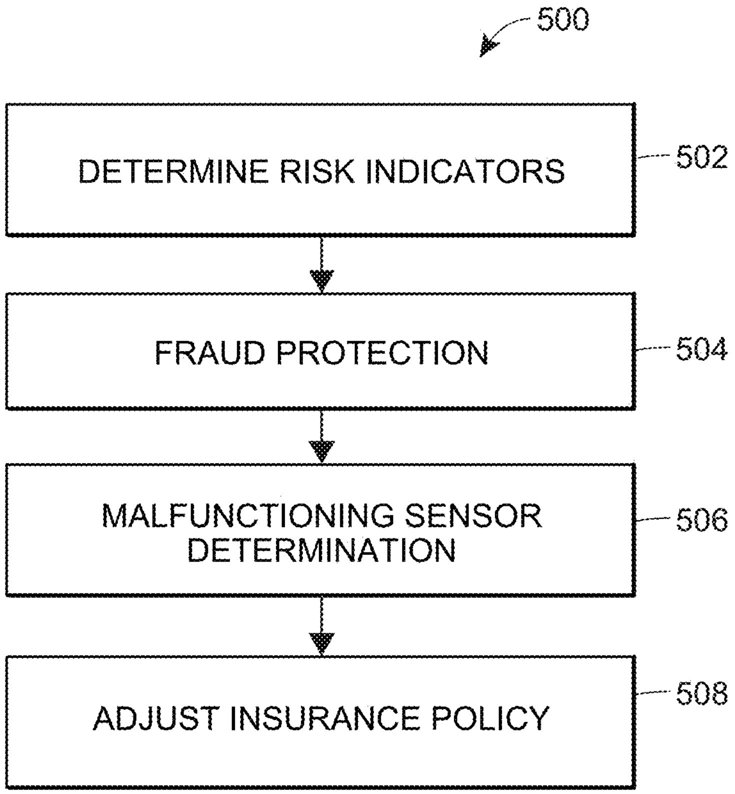
FIG. 9 is flow diagram of an exemplary method of executing a risk determination module in accordance with principles of the present disclosure.

Next, at block 332 of the method 300, the risk determination module 200 stored in the memory 186 of the storage unit 184 of the insurance provider 26 may be executed. Execution of the risk determination module 200 may involve performing steps of the sub-method 500 illustrated in FIG. 9. At block 502, the sub-method 500 may begin with analyzing the report data 146 received from the user computer 24 to determine one or more risk indicators associated with the manner in which the consumable component was repaired or replaced. In one aspect, the analysis at block 502 of the sub-method 500 may include comparing the report data 146 with the correlation data 202 stored in the memory 186 as discussed above. In one aspect, the existence of the failure to repair or replace flag in the report data 146 may be compared with correlation data 202 that indicates a high likelihood of incurring a recognizable loss under an insurance policy, and based on this comparison, a "high risk" risk indicator may be determined. In one aspect, the existence of two or more reminders in the reminder history information in the report data 146 may be compared with correlation data 202 that indicates a medium likelihood of incurring a recognizable loss under an insurance policy, and based on this comparison, a "medium risk" risk indicator may be determined. In one aspect, the existence of a successful repair or replacement flag in the report data 146 may be compared with correlation data 202 that indicates a low likelihood of incurring a recognizable loss under an insurance policy, and based on this comparison, a "low risk" risk indicator may be determined After the one or more risk indicators are determined, the sub-method 500 may proceed to block 504 where the report data 146 is further analyzed for fraud protection. In one aspect, the analysis at block 504 may involve analyzing the condition data collected by the sensor associated with the consumable component of interest to determine whether the condition data indicates that the consumable component still requires repair and/or replacement, despite the existence of a successful repair or replace flag in the report data 146. If so, a "high risk" risk indicator may be assigned to the user and/or consumable component, regardless of the risk indicator determined at block 502.

Next, the sub-method 500 may involve checking whether the sensor of the consumable component of interest is malfunctioning at block 506. In the aspect, the analysis at block 506 may involve running business rules to ignore faulty sensor data. Also, if the sensor is determined to be malfunctioning, the insurance provider 26 may notify the user of the consumable component.

Finally, the sub-method 500 may proceed to block 508 where the risk indicator previously determined is compared to other metrics in order to adjust one or more aspects of an insurance policy covering, or affected by, the device incorporating the consumable component at issue. The one or more aspects of the insurance policy that may be adjusted include, for example, an insurance premium, a rate, a discount, and/or a points or rewards program. In one aspect, if a "high risk" risk indicator has been determined for the consumable component at issue, the policy holder may be charged a surcharge and/or the insurance policy may not be renewed.

III. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA)/field-programmable gate array (FPGA), etc.). A hardware module is a tangible unit capable of performing certain operations and may be configured or arranged in a certain manner. In exemplary implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a method for communication data with an electric vehicle through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the foregoing text sets forth a detailed description of numerous different implementations, it should be understood that the legal scope of the invention is defined by the words of the claims set forth at the end of this patent. The detailed description is to be construed as exemplary only and does not describe every possible implementation, as describing every possible implementation would be impractical, if not impossible. One could implement numerous alternate configurations, using either current technology or technology developed after the filing date of this patent, which would still fall within the scope of the claims.

What is claimed is:

1. An order assistance system comprising:

one or more sensors configured to detect a condition of a consumable component and generate condition data indicating a condition of the consumable component;

a processing unit; and a storage unit coupled to the processing unit, the storage unit including non-transitory computer-readable instructions that, when executed by the processing unit, cause the processing unit to:

determine whether the consumable component requires at least one of replacement or repair by comparing the condition data with one or more maintenance parameters;

in response to a determination that the consumable component requires at least one of replacement or repair, recommending at least one of a replacement component or a repair service and a source of the at least one of a replacement component or a repair service in accordance with one or more order parameters; and compare additional condition data from the one or more sensors with the one or more maintenance parameters to determine whether the consumable component has been successfully repaired or replaced.

2. The order assistance system of claim 1, the one or more order parameters including at least one of: a website for ordering the replacement component or the repair service, a price range for the replacement component or the repair service, a telephone number for ordering the replacement component or the repair service, a geographical area for locating a repair service provider, a delivery date for the replacement component, a time period for a repair service provider to be available, or a minimum aggregate consumer rating for the replacement component or the repair service.

3. The order assistance system of claim 1, the order assistance system including a smartphone.

4. The order assistance system of claim 1, wherein the storage unit stores the one or more order parameters.

5. The order assistance system of claim 4, wherein the storage unit stores the one or more order parameters prior to the determination that the consumable component requires at least one of replacement or repair.

6. The order assistance system of claim 1, wherein the condition of the consumable component depends on use of the consumable component.

7. The order assistance system of claim 1, wherein the non-transitory computer-readable instructions include instructions that cause the processing unit, in response to the determination that the consumable component requires at least one of replacement or repair, to search the Internet for sellers of the replacement component or providers of the repair service in accordance with the one or more order parameters and generate a list of search results for consideration by a user of the consumable component.

8. The order assistance system of claim 1, wherein the non-transitory computer-readable instructions include instructions that cause the processing unit, in response to the determination that the consumable component requires at least one of replacement or repair, to solicit bids from a plurality of repair service providers and generate a list of the bids for consideration by a user of the consumable component.

9. The order assistance system of claim 1, wherein the non-transitory computer-readable instructions include instructions that cause the processing unit, in response to the determination that the consumable component requires at least one of replacement or repair, to automatically order the replacement component or the repair service via the Internet without input from the user.

10. The order assistance system of claim 1, wherein the non-transitory computer-readable instructions include instructions that cause the processing unit, in response to an indication that a user of the consumable component has authorized an order for the replacement component or the repair service, to place the order for the replacement component or the repair service via the Internet.

11. The order assistance system of claim 1, wherein the non-transitory computer-readable instructions include instructions that cause the processing unit, in response to a determination that the consumable component has not been repaired or replaced following the recommendation to repair or replace the consumable component, to generate a reminder notification for a user of the consumable component.

12. The order assistance system of claim 1, wherein the non-transitory computer-readable instructions include instructions that cause the processing unit to store in the storage unit at least one of: (i) an order completion flag indicating that the processing unit has placed an order for the replacement component or the repair service, (ii) a failure to repair or replace flag indicating that the consumable component has not been repaired or replaced following the recommendation to repair or replace the consumable component, (iii) a successful repair or replacement flag indicating that the consumable component has been successfully repaired or replaced, (iv) reminder history information indicating a number of the reminder notifications provided to a user of the consumable component, or (v) repair time information indicating an amount of time between the determination that the consumable component requires at least one of replacement or repair and a determination that the consumable component has been successfully repaired or replaced.

13. The order assistance system of claim 12, comprising a data analysis system configured to determine one or more risk indicators indicating a likelihood of a recognizable loss under an insurance policy based on at least one of the order completion flag, the failure to repair or replace flag, the successful repair or replacement flag, the reminder history information, or the repair time information.

14. The order assistance system of claim 13, the data analysis system being configured to adjust the insurance policy based on the one or more risk indicators.

15. The order assistance system of claim 1, comprising an input unit configured to permit a user of the consumable component to input the one or more order parameters into the order assistance system.

16. The order assistance system of claim 1, wherein the one or more order parameters are pre-selected by a user of the consumable component.

17. The order assistance system of claim 1, wherein the non-transitory computer-readable instructions include instructions that cause the processing unit to search for one or more sellers of the replacement component and/or one or more providers of the repair service, and wherein the processing unit recommends the at least one of a replacement component or a repair service based on the search for one or more sellers of the replacement component and/or one or more providers of the repair service.

* * * * *